F. R. BRADBURY.
DEVICE FOR GREASING COOKING UTENSILS.
APPLICATION FILED NOV. 30, 1909.
956,929.
Patented May 3, 1910.
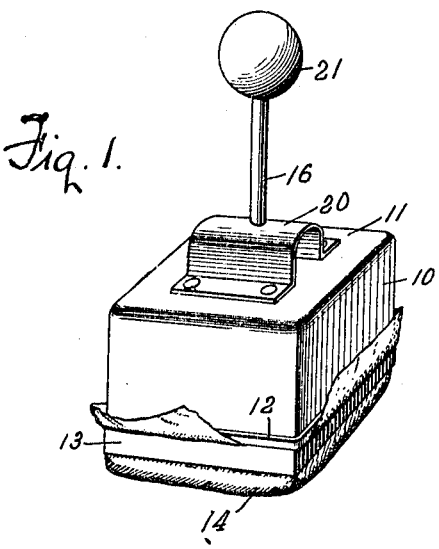
Fig. 1.
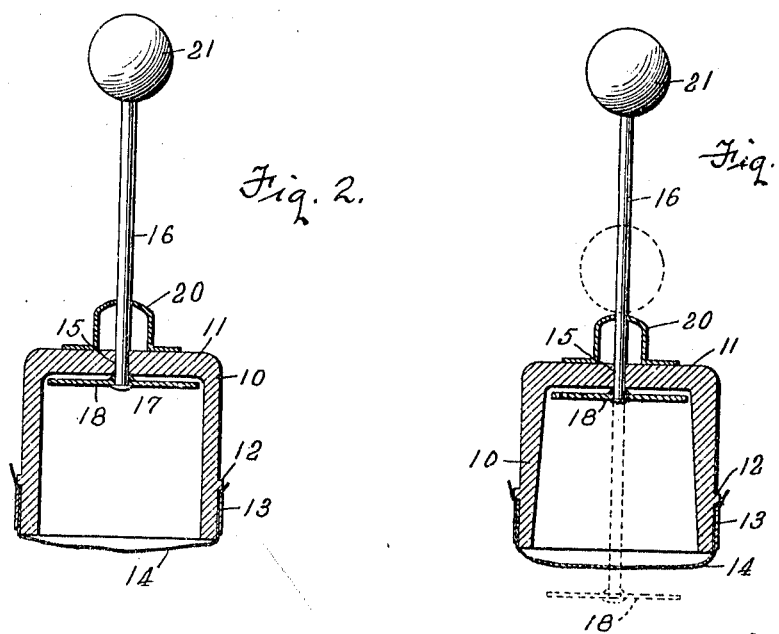
Fig. 2.
Fig. 3.
Witnesses
H. G. Robinette
Horace G. Seitz
Inventor
Fred R. Bradbury
By G. Howlett Davis
Attorney

UNITED STATES PATENT OFFICE.

FRED R. BRADBURY, OF EAST BROWNFIELD, MAINE.

DEVICE FOR GREASING COOKING UTENSILS.

956,929. Specification of Letters Patent. Patented May 3, 1910.

Application filed November 30, 1909. Serial No. 530,693.

*To all whom it may concern:*

Be it known that I, FRED R. BRADBURY, a citizen of the United States, residing at East Brownfield, in the county of Oxford and State of Maine, have invented certain new and useful Improvements in Devices for Greasing Cooking Utensils, of which the following is a specification.

My invention relates to improvements in devices for greasing cooking utensils.

The principal object of my invention is to provide a device for this purpose capable of employing a relatively soft substance, such as lard, hog's grease, etc., as the greasing agent, the device being in the form of a substance container capable of being refilled at will, and having a piston structure which serves as a handle in the operation of the device.

A further object of the invention is to provide a device of this character which is neat and attractive in appearance, durable in construction, simple and efficient in operation, and which can be manufactured and sold at a small cost.

To these and other ends, the nature of which will be readily understood as the invention is hereinafter disclosed, said invention consists in the improved construction and combination of parts, hereinafter fully described, illustrated in the accompanying drawings, and particularly pointed out in the appended claim.

In the accompanying drawings, in which similar reference characters indicate similar parts in each of the views,—Figure 1 is a perspective view of a device constructed in accordance with my invention, Fig. 2 is a vertical cross-sectional view of the same.
Fig. 3 is a view similar to Fig. 2, showing the container of a slightly different cross-sectional configuration.

In the drawings, 10 designates a container of the cup-shaped type, the periphery of the container in horizontal section, being preferably angular, although it will be understood that any other desired peripheral contour may be employed. As indicated in Fig. 2, the side walls of the container are approximately parallel with each other on the inner and outer faces of the wall, one end (the upper) being closed, as indicated at 11, the opposite end being open. The container is preferably provided with a peripheral bead 12 spaced a suitable distance from the open end of the container, said bead serving to limit the upward movement of a securing member 13 having a similar peripheral contour to the contour of the container, said securing member being adapted to be placed over the portion of the container between the bead and the lower end after a suitable piece of material, such as muslin or its equivalent, indicated at 14, has been placed over the mouth or open end of the container, the securing member serving to retain the muslin in position.

The end 11 of the container is provided with a central perforation 15, through which is adapted to extend the stem 16 of the piston 17, said piston consisting of a flat plate 18 secured to the ends of the stem within the container, and being of a size approximating that of the interior of the container on a cross-sectional line. For the purpose of providing an efficient guide for the stem of the piston, I preferably provide the end 11 with a strap 20 of stirrup form, and having an opening therein alining with the opening in the end 11. The end of the stem is provided with a button 21 of suitable configuration and which serves as a handle to manipulate the piston in use, or when the device is being filled. The stem is of sufficient length to provide a length of movement to the piston sufficient to permit it to extend a sufficient distance outward from the open end of the container as will permit of a ready cleansing of the container without removing the piston.

If desired, the inner face of the container walls may be arranged inclined toward the outer face as indicated in Fig. 3, thereby insuring a more perfect movement of the substance toward the cloth or muslin, inasmuch as the piston is not liable to stick to the walls of the container.

While I have shown the securing member 13 in the form of a flat band, the ends of which are secured together in order to make a substantially endless band, it will be understood that I may vary this construction by employing a securing wire in the place of the band, or I may make the band or wire of resilient material and provide the same, if preferred, in the form of split ends, these several forms being provided to suit individual tastes.

To prepare the device for use, it is necessary only to remove the securing member and the muslin, draw out the piston stem to its greatest extent, and fill the interior of the container with the substance to be employed, said substance, as heretofore indicated, being relatively soft, such as lard or hog's grease. After the container has been filled, the muslin is placed over the mouth thereof and the securing member placed in position, whereupon the device is ready for the greasing of the cooking utensil. In use, the handle formed by the stem of the piston may, if desired, be used for the purpose not only of providing for the movement of the piston, but at the same time serve as the guiding means for the device. I prefer, however, to permit the button end of the stem to lie within the palm of the hand, the thumb and fingers of the hand grasping the side walls of the container. This permits of the application of pressure directly on the end of the stem, insuring the movement of the piston without liability of excessive friction on the stem while the container is being moved around the pan, thereby avoiding liability of burning the cloth by reason of imperfect feeding of the piston; furthermore, the palm pressure may be controlled without placing additional pressure of the device on the pan, the fingers retaining the container in the proper position relative to the pan surface. By reason of the presence of the spaced-apart bearings for the stem provided by the openings in the ends and in the stirrup portion, the stem is given a true movement in the direction of its length, thereby preventing wabbling of the piston within the container.

As the substance used is liable to become rancid, the parts are arranged in such manner that the interior of the casing may be readily cleansed, in addition to which both sides of the plunger or piston may also be cleaned in a ready manner.

As will be readily understood, the muslin or other fabric may be renewed at will, there being no necessity for the use of any particular kind of fabric, the requirement being simply that it will permit of the passage of the substance through the interstices thereof.

Having thus described my invention, what I claim as new is:

A device of the character described comprising a cup-shaped container having an open end, the closed end of such container being provided with a central opening, a piston rod slidably mounted in said opening, a stirrup secured to the outside of the closed end of the container and provided with an opening in alinement with the opening in such end so as to provide an auxiliary bearing for the piston rod at a point spaced from the end of the container, a knob or button secured to the outer end of such piston rod and a piston secured to the other end thereof and adapted to snugly fit and normally lie within said container, said rod being of such length that when the knob or button is moved into contact with said stirrup said piston is moved entirely outside of and beyond the open end of said container, a flexible fabric extending over the open end of the container and a hoop encircling the container adjacent its open end and serving to bind the fabric thereto and secure the same in position.

In testimony whereof I have affixed my signature in presence of two witnesses.

FRED R. BRADBURY.

Witnesses:
Geo. E. Smith,
C. R. Duffett.